United States Patent Office 2,970,666
Patented Feb. 7, 1961

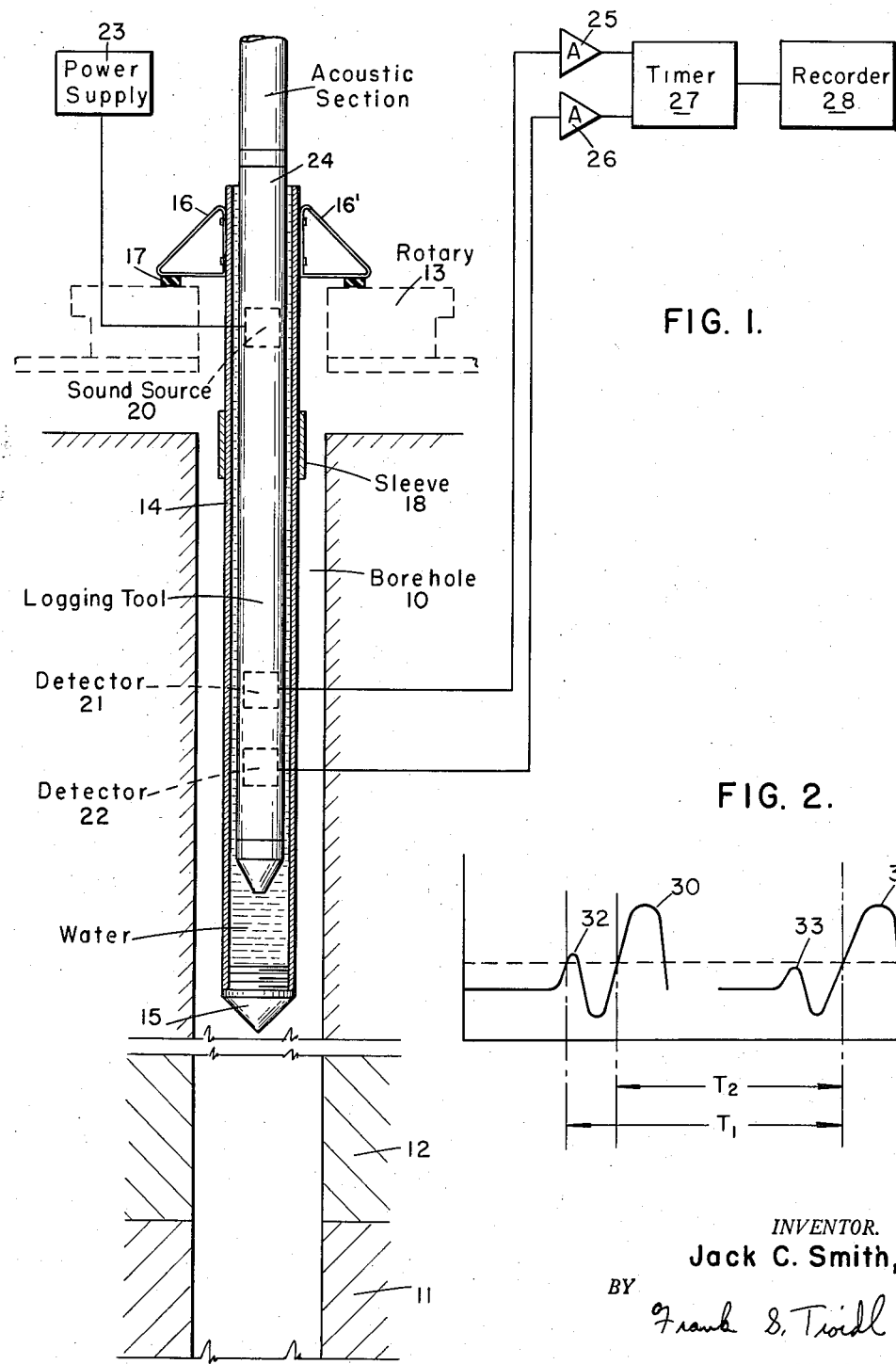

2,970,666

APPARATUS FOR CALIBRATING SEISMIC VELOCITY LOGGERS

Jack C. Smith, Houston, Tex., assignor, by mesne assignments, to Jersey Production Research Company, Tulsa, Okla., a corporation of Delaware Filed Oct. 8, 1958, Ser. No. 766,036

3 Claims. (Cl. 181—.5)

This invention relates to the determination of the velocity of sound through subsurface formations. More particularly, this invention relates to a device for calibrating a tool used for determining the velocity of sound within the subsurface formations.

In geophysical prospecting one method of identifying various subsurface formations is to take what is known as a velocity log. In velocity logging a borehole is drilled through the subsurface formations to a desired depth. A logging tool is then lowered down into the borehole. This tool usually includes a source of sound and at least one sound detector. As the tool is lowered down into the borehole, intermittent sound pulses or waves ar emitted from the sound source. The pulses or waves are then transmitted through the formations adjacent the logger and detected by the detector or detectors. If one detector is used in the tool, a timing means is used to indicate the time it takes the sound to travel from the sound source through the subsurface formations and detected by the detector. If two detectors are used, the timing means may measure the time it takes the sound to travel between two points separated by a distance equal to the separation of the two pickups.

Velocity loggers, particularly those more recently developed, are highly complicated devices. Included in the logger, or at the earth's surface are intricate electrical and electronic circuits. Usually included as a part of the system for velocity logging is a recording means. This recording means usually includes a means such as a galvanometer device which indicates a deflection from a zero or base line which is proportional to the time it takes the sound to travel between two points in the well.

Before a logging tool can be used effectively within the borehole, it must be calibrated. That is, the amount of deflection of the recorded trace from the zero or base line for sound to travel through a particular medium of known acoustic velocity must be ascertained. Formerly the calibration was done in a laboratory. After the tool was calibrated, it was transported to the borehole site where it was used to determine the velocity of sound through the subsurface formations within the borehole. However, various things can occur which will change the calibration of the tool. Since modern velocity loggers include a plurality of electrical and electronic instruments including electronic tubes, a slight drift in one of the many tubes may change the calibration. Also, even a slight knock or jar may affect the accuracy of these electrical components. The inaccuracies and disadvantages thus occasioned are obvious.

The present invention provides the art with a device for eliminating the aforementioned disadvantages. Using the method and device to be described herein, the velocity logging tool can be calibrated at the borehole site just prior to its use within the borehole itself. After the logging tool has been lowered down the borehole and velocity measurements of the subsurface formations within that borehole taken, the tool can then be removed to the earth's surface and again calibrated to ascertain whether the calibration has been changed during the logging operation.

The calibrating device used in carrying out the calibration is light and portable. Hence, it can be easily carried around from one well site to another well site.

A better understanding of the invention as well as its many advantages may be had by reference to the following detailed description and drawings in which:

Fig. 1 is a sectional elevation view of one embodiment of my new portable device for calibrating velocity loggers with the lower portion of a velocity logger shown disposed within the portable device; and Fig. 2 is a graph useful in explaining the function of a particular part of the portable device.

Referring to Fig. 1, a borehole 10 is shown traversing a plurality of subsurface formations such as formations 11 and 12. A rotary table 13 and derrick floor are schematically shown arranged above the borehole 10.

My new calibrator for calibrating a tool used in determining the velocity of sound through the subsurface formations is shown supported at the top of the borehole 10 by the rotary 13.

The portable tool includes a hollow member such as tubular member 14. A plug 15 is screwed into the lower extremity of tubular member 14. Tubular member 14 is open at the top.

Tubular member 14 is made of a material having a known acoustic velocity. Preferably, the velocity of sound through the tubular member 14 should be near the mid-range of normal velocities logged. The velocity of sound through subsurface formations generally range between 5,000 feet per second and 15,000 feet per second. Hence, the tubular member 14 should preferably be made of a material with a velocity characteristic of around 10,000 feet per second. It has been found that certain synthetic resins obtained by the condensation of formaldehyde with phenols provide the desired velocity. Such synthetic resins are sold under the trademark "Bakelite."

Supports 16 are 16' are provided adjacent the upper end of tubular member 14. Three supports (two of which are shown) may be provided. These supports may be spaced apart by a 120° arc. The portable tool is cushioned against vibrations by rubber members 17.

A sleeve 18 is clamped tightly about the tubular member 14. The position of sleeve 18 should be such that it will be between the sound source and the detector or detectors when the logging tool has been placed in the tubular member for calibrations.

The portable device is shown used in calibrating a velocity logging tool including a sound source 20 and a pair of detectors 21 and 22 spaced at different distances in a common direction along a straight line from the sound source 20. A power supply 23 supplies the sound source with intermittent pulses for generating sound pulses. The sound pulses follow the shortest time path to the detectors. The material of which the acoustic section 24 of the logging tool is made is highly resistant to the transmission of sound. Hence, the sound travels first from the sound source 20 through the fluid such as water, which has been placed in the portable device to provide an acoustic coupling between the logging tool and the tubular member 14, then through the tubular member 14, then through the fluid coupling, and then detected. The sound pulses are first detected by detector 21 and then by detector 22.

When detector 21 detects the sound pulse, an electrical signal is fed to an amplifier 25. Subsequently, as detector 22 detects the sound pulse, an electrical signal is fed to an amplifier 26. The resulting pulses from amplifiers 25 and 26 are fed to a timer 27. Timer 27 measures the time it takes a pulse from amplifier 26 to reach the timer after a pulse from amplifier 25 has been fed to the timer 27. The timer 27 emits a signal for a period of time proportional to the difference in time it takes the pulse from sound source 20 to be detected by detectors 21 and 22. The signal from timer 27 is fed to a recorder 28. Recorder 28 may include a galvanometer which is deflected an amount proportional to the length of the signal from timer 27. The deflection is recorded on a film with the deflection from a zero or base line being indicated.

It can be shown mathematically that the time difference it takes the sound to be detected by detectors 21 and 22 is equal to the time it takes the sound to travel through the tubular member 14, a distance equal to the distance between detectors 21 and 22. We know the velocity through tubular member 14. We know the separation of detectors 21 and 22. From this, we can get the time by means of the formula:

$$T = \frac{D}{V}$$

wherein $T$=the time difference it takes the sound to be detected by detectors 21 and 22. $D$=distance between detectors 21 and 22. $V$=velocity through tubular member 14. We record the deflection of recorder 28 when calibrating. With the deflection known for a definite time, we can compute the number of micro-seconds for one inch deflection. This is used throughout the log when computing interval velocities.

It has been found through experience that a "forerunner" often accompanies and slightly precedes the desired acoustic pulses which are detected by the detectors. This "forerunner" is usually of very small amplitude. Sometimes the amplitude of the "forerunner" is not great enough to trigger the amplifiers 25 and 26. However, sometimes the amplitude of the "forerunner" is great enough to trigger the amplifiers 25 and 26. Thus, unless we eliminate the "forerunner," the calibrator may be inefficient.

An example of a difficulty encountered because of the "forerunner" is illustrated in Fig. 2. In Fig. 2 the desired acoustic pulse to amplifier 25 is indicated by pulse 30. The desired pulse to amplifier 26 is indicated by pulse 31. The dashed line indicates the threshold voltage level of the amplifier tubes in amplifiers 25 and 26. The correct time interval is indicated by $T_2$. This is the difference in time between the leading edge of pulse 30 and the leading edge of pulse 31 as they pass through the threshold voltage of the tubes. The "forerunner" of pulse 30 is indicated by pulse 32. The "forerunner" of pulse 31 is indicated by pulse 33. Pulse 32 is of sufficient amplitude to trigger the amplifier 25. However, pulse 33 is not high enough to trigger amplifier 26. Hence, because of this unwanted "forerunner" problem, the recorded value of time is indicated by $T_1$. This is a false value.

It has been found that by including in the new portable device the sleeve 18 which is clamped tightly about the tubular member 14, the "forerunner" is completely eliminated so that accurate readings of the time interval are obtained.

In carrying out my new method, I first lower the portable tool into the borehole 10 through rotary table 13. The portable tool is supported by the rotary table 13. A liquid such as water is then poured into the tubular member 14. The logging tool is then placed into the tubular member 14 so that the sound source and sound detector or detectors are within the hollow tubular member 14 and below the liquid level. A permanent record is then made of the deflection caused by the calibrator on the same film that the subsequent velocity log will be made. The logging tool is then lifted out of the tubular member 14. The tubular member 14 is then removed from the wellhead 13. The velocity logging tool is then lowered into the borehole 10 and the subsurface formations such as subsurface formations 11 and 12 are logged. After the well has been logged, if desired, the same procedure for calibrating may be repeated.

Though particularly adapted for use in the field, the invention can also be used in the laboratory, for example, to calibrate a new tool. To calibrate a new logging tool, the tool is placed in the calibrator and the top tilted in any direction to cause the lower section to lay against one side of the tube 14. The logger is then rotated as the travel time between the detectors is recorded. If the detectors are not directly in line, a variation in time recorded will indicate a change as the logger is rotated and indicate the amount of error built into the acoustic section.

The distance between the electrical centers of a new two detector logger can also be determined in the laboratory. A new logger is placed in the tubular member 14. The time difference in the arrival of the pulse at the two detectors is measured. Knowing the velocity through tubular member 14 and the time difference, the distance between the electrical centers can be computed using the formula:

$$D = VT$$

I claim:
1. A portable device for use in calibrating a tool used in measuring the velocity of sound through subsurface formations, the tool including at least one sound detector longitudinally spaced from the sound source including: a hollow member completely closed at one end so as to be adapted to receive an acoustic coupling fluid; and a sleeve member clamped around the outside of the hollow member and positioned so as to be between the sound source and the detector when the tool has been placed in the tubular member.

2. A portable device in accordance with claim 1 wherein the hollow member is made of material through which sound travels with a velocity within the range of velocities expected in the subsurface formations.

3. A portable device for use in calibrating a tool used in measuring the velocity of sound through subsurface formations, the tool including a sound source and two sound detectors spaced at different distances in a common direction from the sound source including: a tubular member completely closed at one end so as to be adapted to receive an acoustic coupling fluid made of material through which sound travels with a velocity in the mid range of velocities expected in the subsurface formations; and a sleeve member clamped about the outside of the tubular member to prevent any forerunner signals, said sleeve member being positioned so as to be between the sound source and the sound detectors when the tool has been placed in the tubular member.

References Cited in the file of this patent

UNITED STATES PATENTS

| | | |
|---|---|---|
| 2,156,052 | Cooper | Apr. 25, 1939 |
| 2,246,611 | Zandmer | June 24, 1941 |
| 2,813,590 | McDonald | Nov. 19, 1957 |
| 2,918,651 | Podolak et al. | Dec. 22, 1959 |